US006824053B2

(12) United States Patent
Bluemer

(10) Patent No.: US 6,824,053 B2
(45) Date of Patent: Nov. 30, 2004

(54) VOTER INTERFACE UNIT

(75) Inventor: Robert Bluemer, New Lenox, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 10/038,785

(22) Filed: Dec. 31, 2001

(65) Prior Publication Data

US 2003/0121975 A1 Jul. 3, 2003

(51) Int. Cl.[7] .................................................. G06F 17/60
(52) U.S. Cl. ............................ 235/386; 235/51; 235/57
(58) Field of Search ............................ 235/386, 51, 50, 235/57, 379; 705/14

(56) References Cited

U.S. PATENT DOCUMENTS

| | | | | |
|---|---|---|---|---|
| 5,293,464 A | * | 3/1994 | Hirano et al. ................ | 358/1.1 |
| 5,544,320 A | * | 8/1996 | Konrad ....................... | 709/203 |
| 5,732,222 A | * | 3/1998 | Miyagawa et al. ........... | 705/12 |
| 5,821,508 A | | 10/1998 | Willard | |
| 5,875,432 A | * | 2/1999 | Sehr ............................ | 705/12 |
| 6,149,055 A | * | 11/2000 | Gatto ......................... | 235/379 |
| 6,250,548 B1 | * | 6/2001 | McClure et al. .............. | 235/51 |
| 6,496,802 B1 | * | 12/2002 | van Zoest et al. ............ | 705/14 |

FOREIGN PATENT DOCUMENTS

JP 02001067508 A * 3/2001 ........... G07C/13/00

OTHER PUBLICATIONS

Peter Gwynne, “Electronic Voting Systems Make Inroads in U.S. Local Elections, ” IEEE Spectrum, pp. 20–22, Oct. 2001.

* cited by examiner

*Primary Examiner*—Michael G. Lee
*Assistant Examiner*—Seung H Lee
(74) *Attorney, Agent, or Firm*—Ryan, Mason & Lewis, LLP

(57) ABSTRACT

An electronic voting system is provided that includes at least one voter interface unit associated with network. The voter interface unit is enabled to identify a voter using a disability related communication device coupled to the network, deliver ballot choices to the voter, accept a ballot choice made by the voter, and deliver the ballot choice to a tabulation system. The system may be configured to confirm each ballot selection made by the voter. The system may further include a ballot design database to provide ballot choices and/or a voter registration database. The system may also be configured to enable the voter with an option to connect the voter with a live poll worker, if desired by the voter, at any time when the voter is connected to the system.

22 Claims, 6 Drawing Sheets

VOTER INTERFACE UNIT

FIELD OF THE INVENTION

This invention relates generally to a voter interface unit and more particularly to a voter interface unit that permits disabled people to register and vote from a location that is remote from a polling place.

BACKGROUND OF INVENTION

In 1998, Congress amended the Rehabilitation Act to require Federal agencies to make their electronic and information technology accessible to people with disabilities. Inaccessible technology interferes with an individual's ability to obtain and use information quickly and easily. Section 508 of the Act was enacted to eliminate barriers in information technology, to make available new opportunities for people with disabilities, and to encourage development of technologies that will help achieve these goals. Under Section 508, Federal agencies must give disabled employees and members of the public access to information that is comparable to the access available to others.

The above-described law applies to all Federal agencies, including the Federal Elections Committee, when they develop, procure, maintain, or use electronic and information technology. Recent events have caused the public and government to more closely analyze how voters are registered, ballots are cast, and votes tabulated. As part of this analysis, some have recognized that the present voting system for the disabled is grossly inadequate.

For example, the current registration process for a disabled person typically requires the person to first determine the closest registration location, determine if the location is physically accessible, schedule a time to register during hours the registration location is open, obtain a ride to the registration location, provide registration information and relinquish anonymity if assistance is needed, and obtain a ride home. The registration information is then authenticated and a registration card is created and sent to the voter.

The current voting process for a disabled person typically requires the person to first determine the closest physically accessible polling place, schedule time to vote during hours the polling location is open, obtain a ride to the polling location, confirm registration status and show identification, queue in line to cast a ballot, cast a ballot and relinquish anonymity if assistance is needed, take the ballot and hand it to a poll worker, and obtain a ride home. Ballots are then tabulated and the tabulated poll figures and sent to the appropriate governmental authority.

Attempts have been made to address some of the inconveniences encountered by disabled people trying to vote. For example, U.S. Pat. No. 5,821,508 issued to Willard and entitled "Audio Ballot System" discloses an electronic kiosk-type voting device that supplies candidate or referendum information audibly at a polling place such that the voter can respond to selection options by speech input or actuating a button on a hand-held device. Other electronic voting devices are discussed in an article by P. Gwynne, "Electronic Voting Systems Make Inroads in U.S. Local Elections," IEEE Spectrum, October 2001. However, these devices are discussed more in the context of the general public as opposed to disabled individuals. In addition, according to the article, the experts still believe it is necessary to have individuals, including disabled people, vote at a designated polling place.

Accordingly, a need still exists for an electronic voting system that fully addresses the needs of the disabled and complies with Federal regulations.

SUMMARY OF THE INVENTION

The invention provides apparatus and methods for a disabled voter to register and vote by using a system that includes a novel voter interface unit.

In accordance with one aspect of the invention, the system includes at least one voter interface unit associated with a network, e.g., a multi-media network. The voter interface unit is enabled to identify a voter using a disability related communication device coupled to the network, deliver ballot choices to the voter, accept a ballot choice made by the voter, and deliver the ballot choice to a tabulation system. The voter interface unit can be further enabled to prompt the voter to provide voter registration information, accept voter registration information provided by the voter, and deliver the voter registration information to a voter registration database. In a preferred embodiment, the voter interface unit can connect the disabled voter to a live poll worker at any time during the voting or registration process at the request of the voter, preferably without any additional peripheral equipment or software.

The system has numerous advantages over those known in the art. First, the voter can use the communication device that he/she feels comfortable with and need not travel to a polling place to register or vote. The system also prevents duplicate ballots from being cast. As compared to overlay or kiosk-type solutions, there is no coordination, shipping, storage or maintenance of polling place equipment, no training of poll workers, no training for users, no ballot printing, and no voter intent confusion. Furthermore, the electronic voting system of the invention is fully compliant with Section 508 of the 1998 Rehabilitation Act.

DETAILED DESCRIPTION OF THE INVENTION

Although the invention will be illustrated below in conjunction with the processing of votes in an exemplary system, it is not limited to use with any particular system configuration. Those skilled in the art will recognize that the invention can be implemented using a wide variety of different system configurations.

The present invention in an illustrative embodiment provides a voting system for the disabled. The system is fully compliant with Section 508 of the 1998 Rehabilitation Act and allows a disabled person to cast a ballot from anywhere at any time using whichever communication device the person feels comfortable with. The system delivers ballot options to the voter at any location, either audibly, on a disability device screen, or on a disability device printer. The system allows the voter to correct common ballot errors before the ballot is cast, and provides audible, screen or printed confirmation of their ballot choices before the voter submits a ballot for tabulation. The system provides substantially instantaneous recounts and certification, while retaining voter anonymity.

Figure 1:
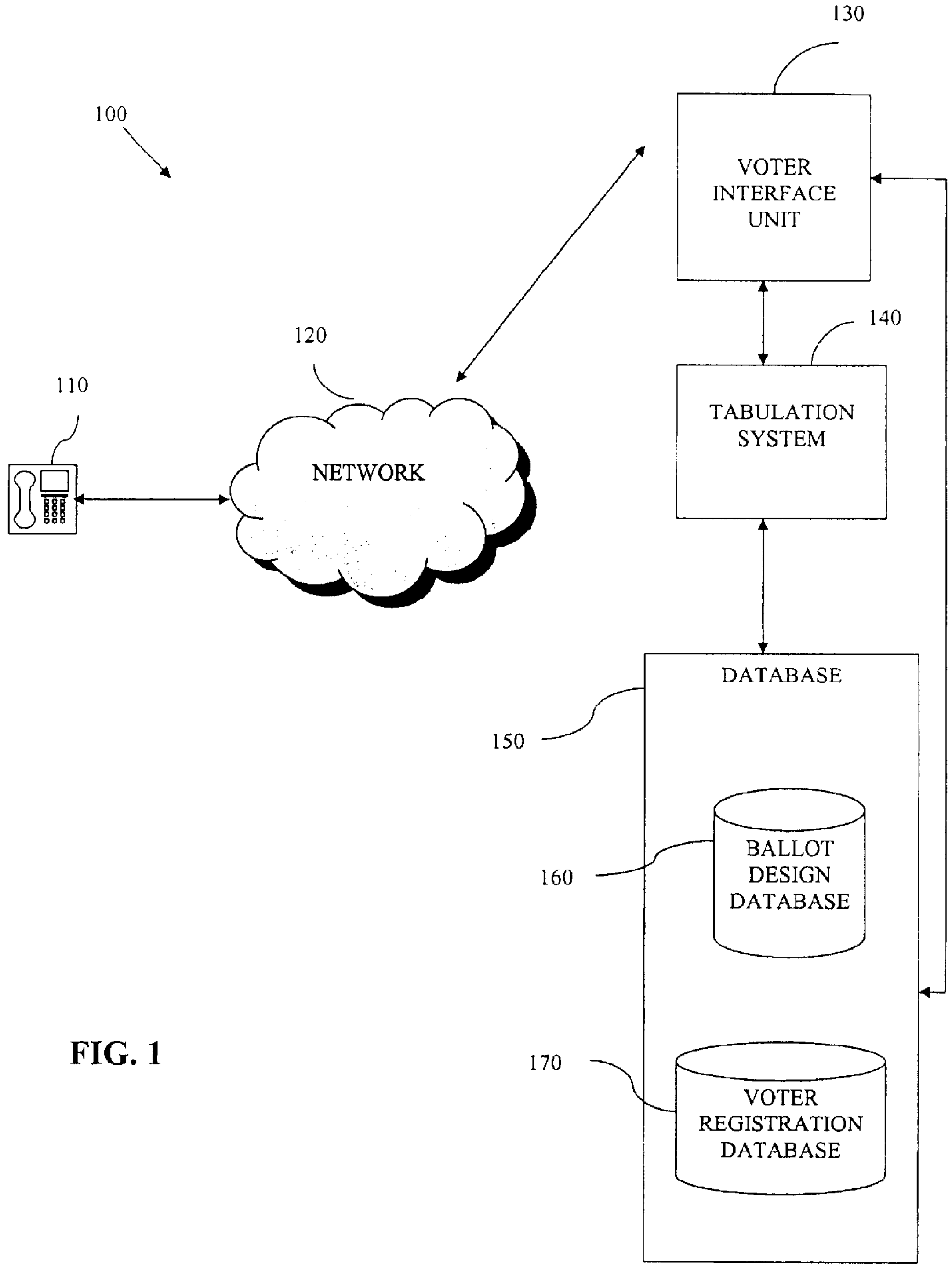
FIG. 1 is a diagram of an exemplary voting system in accordance with an illustrative embodiment of the invention.

FIG. 1 shows an example voting system 100 in accordance with an illustrative embodiment of the invention. The system 100 includes at least one disability related communication device 110 coupled to a network 120. The communication device 110 can be any device chosen by the disabled person to communicate information to a network 120. For example, communication devices currently used by disabled persons include a basic telephone, personal and laptop computers, amplified telephone, cellular telephone and other wireless devices, hand-held computing device, hearing carryover telephone, Relay-American Standard Code for Information Interchange (ASCII), Relay-Voltage Controlled Oscillator (VCO), Relay-Teletype (TTY), Relay-(Voice), speech recognition devices, talking-aid devices, touch tone input devices, TTY with built-in printer, TTY with braille, TTY with large visual display, and voice carryover telephone. The network 120, e.g., a multi-media network, can include any type of communication medium for conveying information, including a wireless communication link, such as radio frequency, satellite, microwave, etc., and a dedicated communication connection, such as telephone, cable, fiber optic, etc. Examples of dedicated communication connections include POTS, internet, and direct dial-up.

Although only a single communication device is shown in the figures, it is contemplated that system 100 may include many such devices, each coupled to the network 120 and operating in the manner described herein.

The system 100 also includes a voter interface unit 130. The voter interface unit is further described with regard to FIG. 2.

The system 100 also includes a tabulation system 140 for tabulating votes. The tabulation system 140 can be apart of or separate from the voter interface unit 130. The tabulation system 140 can be a conventional processing unit and can include a microprocessor, central processing unit, or any other data processing element that may be utilized in a given data processing device, as well as an associated memory or other storage device(s).

The system 100 further includes a database 150. In a preferred embodiment, the database includes a ballot design database 160 and a registration database 170. The ballot design database 160 provides the ballot choices to be determined by the voter. The registration database 170 provides registration information regarding the individual voter such that the voter interface unit 130 can confirm the identity and registration status of the voter. Combinations or portions of these and other databases may be utilized in the system 100 according to the information to be delivered to the voter and information to be received and confirmed from the voter. Also, the database 150 may be a part of or separate from the voter interface unit 130.

Figure 2:
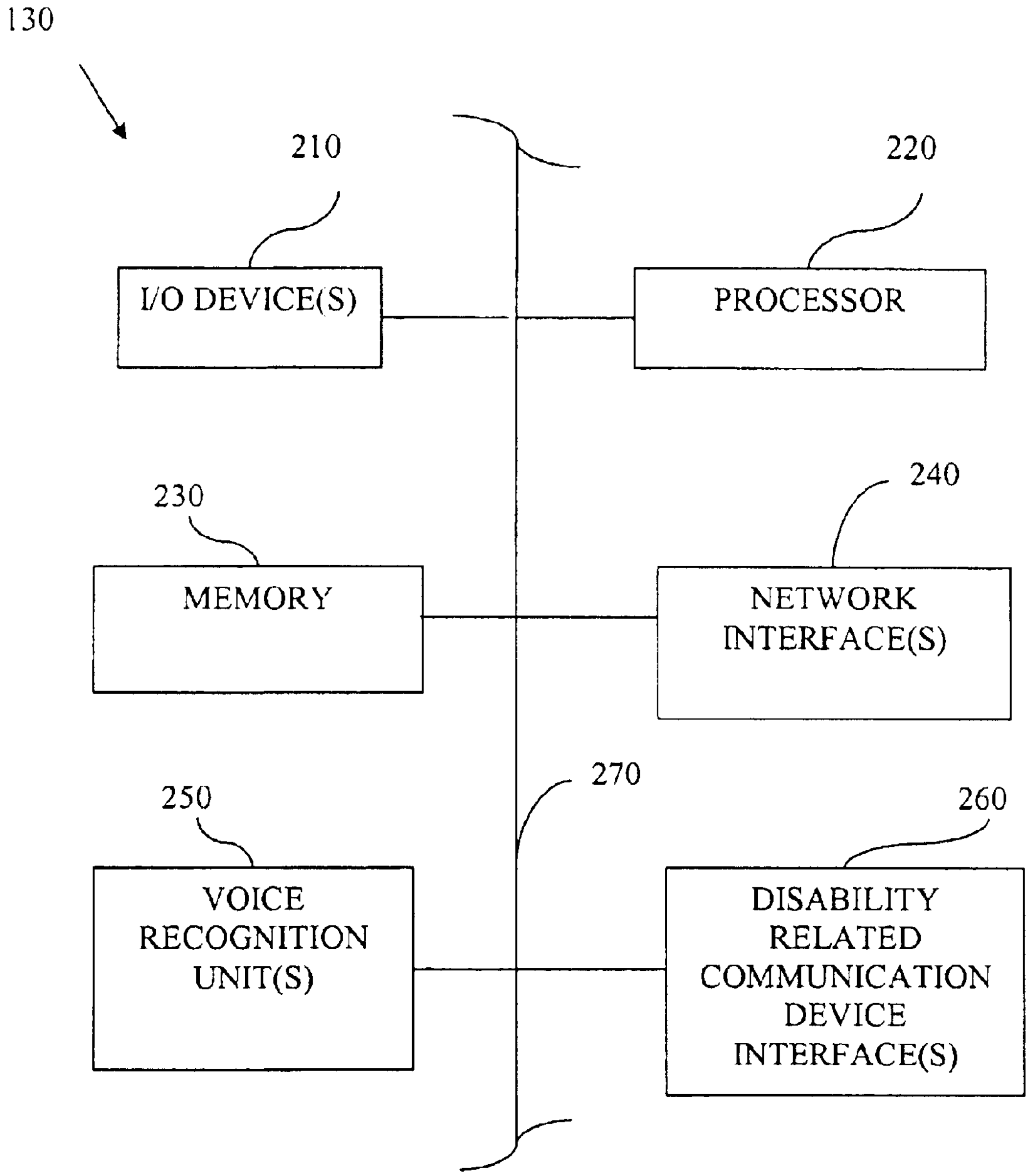
FIG. 2 is a block diagram of a voter interface unit in accordance with an illustrative embodiment of the invention.

FIG. 2 illustrates a diagram of the voter interface unit 130 in accordance with an illustrative embodiment of the invention. The voter interface unit 130 in this embodiment includes input/output (I/O) device(s) 210, a processor 220, a memory 230, and interface(s), such as network interface(s) 240, voice recognition unit(s) 250, and disability related communication device interface(s) 260, all connected to communicate over a system bus 270.

Elements or groups of elements of the voter interface unit 130 may represent corresponding elements of an otherwise conventional desktop computer, as well as portions or combinations of these and other processing devices. Moreover, in other embodiments of the invention, some or all of the functions of the processor 220 or other elements of the voter interface unit 130 may be combined into a single device. For example, one or more of the elements of the voter interface unit 130 may be implemented as an application specific integrated circuit (ASIC) or line card to be incorporated into a computer or other processing device.

The term "processor" as used herein is intended to include a microprocessor, central processing unit, or any other data processing element that may be utilized in a given data processing device to perform one or more or the functions described herein. In addition, it should be noted that the memory 230 may represent an electronic memory, an optical or magnetic disk-based memory, a tape-based memory, as well as combinations or portions of these and other types of storage devices. For example, memory 230 may represent an electronic memory of a computer or other processing device and includes the associated drives such as CD ROM drive and floppy disk drive.

The I/O device(s) 210 can include, for example, one or more input devices (e.g., keyboard, mouse, etc.) for entering or altering data or software in the voter interface unit 130. The I/O device(s) 210 can also include one or more output devices, for example, video monitor, printer, etc.

The voter interface unit 130 also includes one or more interfaces. For example, the voter interface unit 130 includes a network interface(s) 240. The network interface(s) 240 can include any conventional network interface. For example, a local area network (LAN) interface card can be used to support, e.g., an Ethernet port. In addition, the interface may include, for example, a wireless interface using a protocol including but not limited Bluetooth™, IEEE 802.11b, and wireless universal serial bus (USB). The voter interface unit 130 also includes a disability related communication device interface(s) 260. The disability related communication device interface(s) 260 enables the voter interface unit 130 to receive data from and transmit data to a disability related communication device, such as a disability related communication device operated by a voter 110 or operated by a poll worker assisting the voter. Conventional interfaces can be used to communicate with such devices, e.g. TTY over a POTS network. The voter interface unit 130 can also include one or more conventional voice recognition units (VRUs) 250.

One example of a voter interface unit in accordance with the present invention includes the following:

CPU—500 MHz Pentium III

Memory—512 MB

Video—built-in to CPU complex

LAN ports—two 10/100 Mbps Ethernet ports built-in to the CPU complex

Cartridge Tape Units—one 8/4 GB Tandberg cartridge SCSI tape

CD ROM—a read only CD ROM drive

Floppy Disk—one 3.5 inch, 1.44 MB floppy disk drive is built-in to the CPU complex Backplane—16 peripheral component interconnect (PCI) slots.

Figure 3:
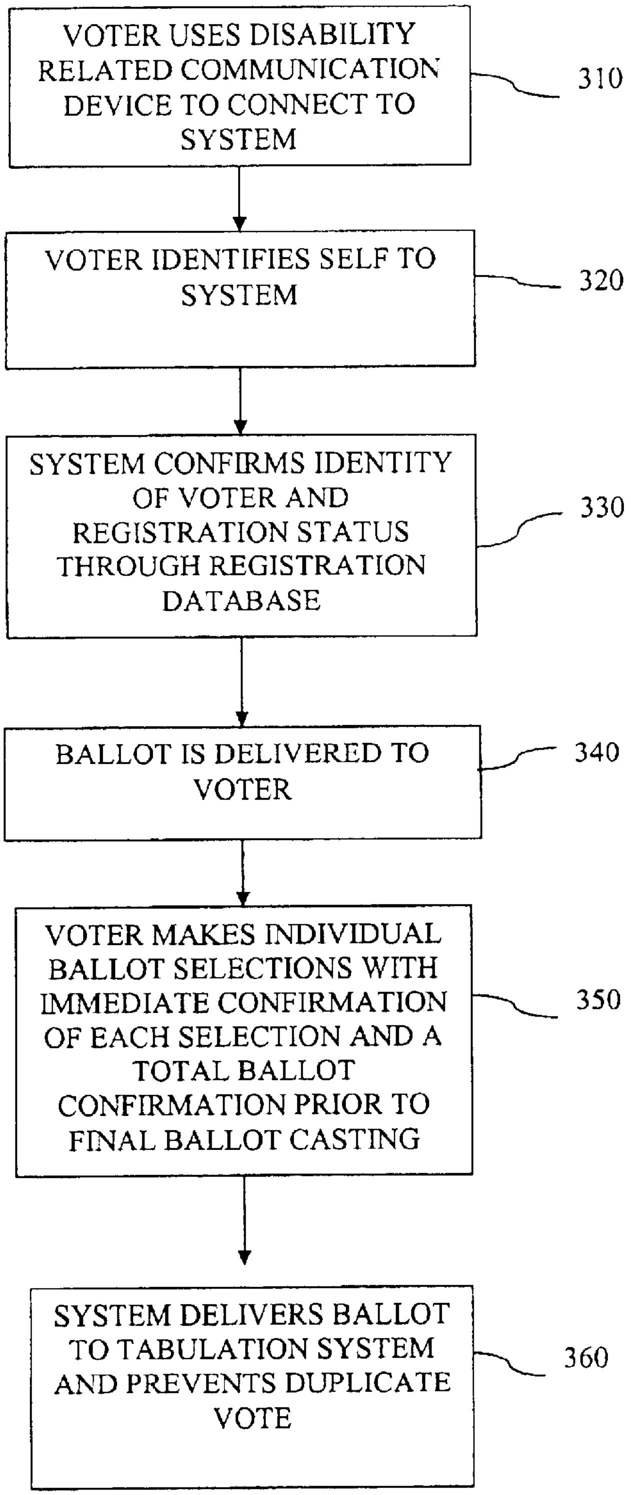
FIG. 3 is a flow diagram showing the operation of an exemplary voting system in accordance with an illustrative embodiment of the invention.

FIG. 3 is a flow diagram showing the steps performed by the system 100 in accordance with an illustrative embodiment of the invention. In step 310, a voter uses a disability related communication device, e.g. communication device 110, to connect to the system. The voter then identifies him/herself to the system in step 320. This identification can be performed in a number of different ways depending upon the type of communication device the voter is using. For example, if the voter is able to speak, the identification may simply be stating the voter's name. If a telephone is being used as the communication device, the identification may include inputting certain identification numbers, such as social security number and/or voter registration number. The system then confirms the identity of the voter and the voter's voting registration status in step 330 by accessing such information from a voter registration database 170. In addition, the system may perform other security clearance checks as is known in the art. For example, conventional voice recognition techniques could be used to identify the voter. Once the voter's identification has been confirmed, a ballot is delivered to the voter in step 340. The ballot can be obtained from a ballot design database 160 designed for the precinct in which the voter resides. Once the ballot selections are received by the voter through the disability related communication device 110, the voter makes individual ballot selections, as indicated instep 350. In a preferred embodiment, the system provides immediate confirmation of each ballot selection and a total ballot selection confirmation prior to ballot casting in step 350. For example, if the voter were blind, the system can read back each selection made by the voter immediately after the voter has made the selection and request confirmation by the voter. The system can also read back the total ballot before the ballot is cast and request confirmation by the voter. The voter can thus correct any ballot error before the ballot is cast. The system then delivers the ballot to a tabulation system, e.g., tabulation system 140, and prevents a duplicate vote from that voter, as indicated in step 360.

In a preferred embodiment, the system provides a "zero-out option." With this option, the voter can press "0" on the telephone or give another appropriate indication specified by the system that would allow the voter at any time during the voting process to reach a live poll worker without requiring the voter to utilize additional peripheral equipment or software. For example, if the voter is communicating on a TTY device, no additional TTY device is required for the voter to communicate with the poll worker. The voter interface unit 130 bridges the voter with the live poll worker. The voter interface unit 130 is capable of automatically determining the type of disability related communication device 110 utilized by the voter. Based on this determination, the voter interface unit 130 can automatically connect the voter with a poll worker having equipment that is compatible with the disability related communication device 110 utilized by the voter. For example, if the voter is using a TTY device, the voter interface unit 130 will determine the use of the TTY device and bridge the voter with a poll worker capable of communicating with a TTY device.

Figure 4:
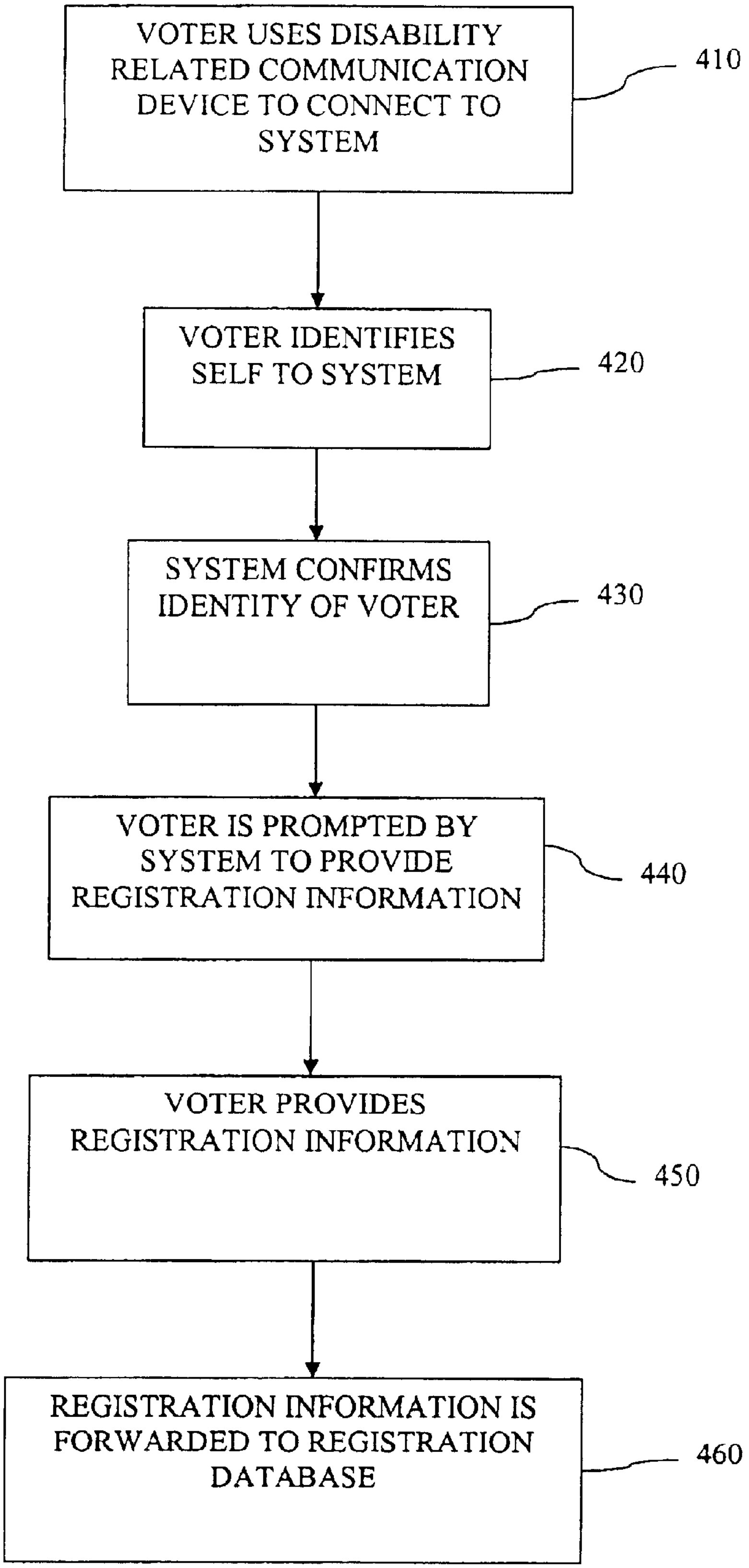
FIG. 4 is a flow diagram showing the operation of an exemplary voter registration system in accordance with an illustrative embodiment of the invention.

The system 100 can also be used to register a voter. FIG. 4 is a flow diagram that shows the steps performed in a registration process in accordance with an illustrative embodiment of the invention. The process permits a disabled voter to register from a remote location, i.e., a location other than a polling place or location conventionally used to register. The voter uses the disability related communication device, e.g., communication device 110, to connect to the system in step 410. The voter then identifies him/herself to the system in step 420. The identification of the voter is then confirmed in step 430. Once the identity of the voter is confirmed, the voter is prompted by the system to provide certain registration information in step 440. The voter provides the requisite registration information via the disability related communication device in step 450. The registration information is then forwarded to the voter registration database 170, as indicated in step 460, where the registration information is authenticated, the registration identification is confirmed and, if requested by the voter, a registration card is generated.

Figure 5:
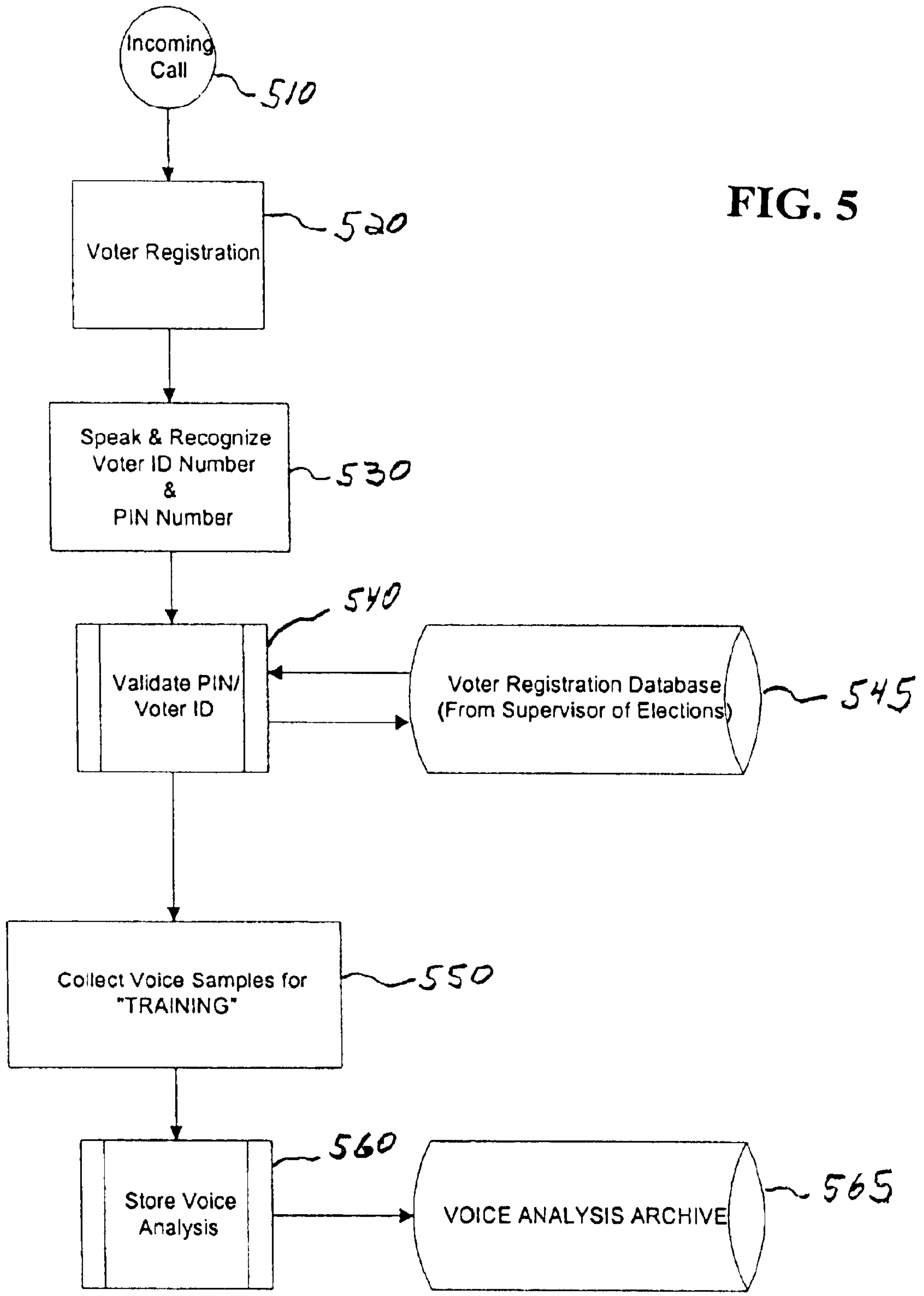
FIG. 5 is a flow diagram showing the operation of a preferred voting system in accordance with an illustrative embodiment of the invention.

FIG. 5 is a flow diagram demonstrating a preferred method of voter registration in accordance with an illustrative embodiment of the invention. In step 510, a call enters the system 100 from a disabled voter. The voter then indicates a desire to register in step 520. The voter verbally provides a voter ID number and personal identification (PIN) number in step 530 which is recognized by the system 100. The PIN number and voter ID number is validated in step 540 based upon information stored in a voter registration database 545, which may represent a portion of registration database 170 of FIG. 1. The system 100 then collects voice samples from the voter in order to "train" the system to identify the voter's voice in step 550. The voice analysis is then stored in step 560, preferably in a voice analysis archive 565, which may represent a portion of registration database 170 of FIG. 1.

Figure 6:
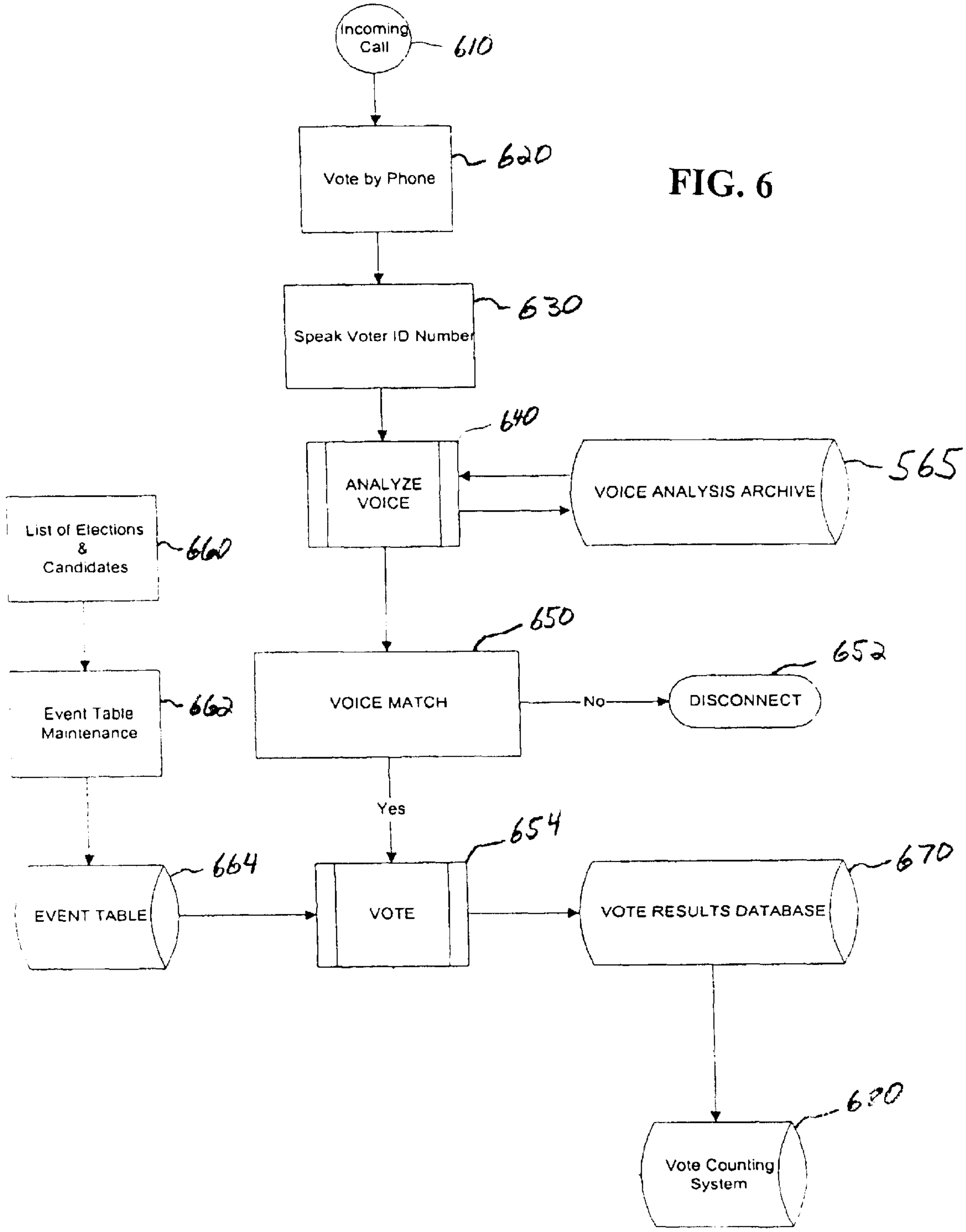
FIG. 6 is a flow diagram showing the operation of a preferred voter registration system in accordance with an illustrative embodiment of the invention.

FIG. 6 is a flow diagram demonstrating a preferred voting procedure based upon the registration procedure set forth in FIG. 5. In step 610, a call enters the system 100 from a disabled voter. The voter then indicates a desire to vote in step 620 and provides a voter ID number in step 630. The voice is then analyzed in step 640 by the system 100 based at least in part on the voice information stored in the voice analysis archive 565. In step 650, a determination is made whether a match exists between the voice and the voter ID number. If there is no match, the voter is disconnected in step 652. If there a match, the voter is permitted to vote in step 654. The ballot options, e.g a list of elections and candidates 660, are maintained in an event table 662. The event table 664 is then presented in order for the voter to cast his/her vote 654. The list of election candidates 660, event table maintenance 662 and event table 664 each may represent a portion of the ballot design database 160 of FIG. 1. Voting results are then forwarded to a database in step 670 which can then be counted by a vote counting system in step 680.

The invention can be implemented at least in part in the form of one or more software programs which are stored on an electronic, magnetic or optical storage medium, for example, the memory 230 of FIG. 2 and executed by a processing device, for example, by the processor 220 of FIG. 2.

The diagrams of the system shown in FIG. 1, the diagram of a voter interface unit shown in FIG. 2, and the flow diagrams of the system shown in FIGS. 3–6 are by way of example only, and other arrangements of elements can be used. It is to be understood that these and other embodiments and variations shown and described herein are merely illustrative of the principles of this invention and that various modifications may be implemented by those skilled in the art without departing from the scope and spirit of the invention.

What is claimed is:

1. An electronic voting system, comprising:

at least one disability related communication device used by a voter and coupled to a network; and at least one voter interface unit coupled to said network, said voter interface unit being enabled to confirm identification information provided by the voter, deliver ballot choices to the voter, accept a ballot choice made by the voter, and deliver the ballot choice to a tabulation system;

wherein the voter interface unit is operative to automatically identify the disability related communication device as being of a particular type, and to alter the manner in which it confirms identification information provided by the voter and delivers ballot choices to the voter based at least in part on the automatically identified device type; and wherein based on the identification of the type of disability related communication device, the voter interface unit is further operative to connect the voter with a live poll worker equipped to communicate with the particular type of disability related communication device being used by the voter.

2. The system of claim 1 wherein the disability related communication device comprises at least one of a basic telephone, personal or laptop computer, amplified telephone, cellular telephone or other wireless device, hand-held computing device, hearing carryover telephone, Relay-(ASCII), Relay-(VCO), Relay-(TTY), Relay-(Voice), speech recognition device, talking-aid devices, touch tone input devices, TTY with built-in printer, TTY with braille, TTY with large visual display, voice carryover telephone, or a combination thereof.

3. The system of claim 1 wherein said network comprises at least one of plain old telephone service (POTS), cable, or Internet.

4. The system of claim 1 wherein the voter interface unit confirms each ballot selection made by the voter.

5. The system of claim 4 wherein said confirmation of each ballot selection made by the voter is performed immediately after each selection.

6. The system of claim 1 wherein the voter can correct any ballot error before the ballot is cast.

7. The system of claim 1 wherein the system further comprises a ballot design database that provides ballot choices to be decided by the voter.

8. The system of claim 1 wherein the system further comprises a voter registration database that provides voter registration information concerning the voter.

9. The system of claim 8 wherein said voter interface unit confirms identification information provided by the voter at least in part by utilizing said voter registration information.

10. The system of claim 1 wherein said voter interface unit confirms identification information provided by the voter at least in part through voice recognition.

11. The system of claim 1 wherein the voter interface unit is further enabled to connect the voter with a live poll worker, if desired by the voter, at any time when the voter is connected to the system.

12. The system of claim 11 wherein the voter is connected with the poll worker without requiring any additional peripheral equipment or software.

13. The system of claim 1 wherein said voter interface unit is further enabled to prompt the voter to provide voter registration information, accept voter registration information provided by the voter, and deliver the voter registration information to a voter registration database.

14. A method for a disabled voter using a disability related communication device coupled to a network to cast a vote from a location remote from a polling place, said method comprising;

connecting to at least one voter interface unit coupled to said network, said voter interface unit being enabled to confirm identification information provided by the voter, deliver ballot choices to the voter, accept a ballot choice made by the voter, and deliver the ballot choice to a tabulation system;

wherein the voter interface unit is operative to automatically identify the disability related communication device as being of a particular type, and to alter the manner in which it confirms identification information provided by the voter and delivers ballot choices to the voter based at least in part on the automatically identified device type; and wherein based on the identification of the type of disability related communication device, the voter interface unit is further operative to connect the voter with a live poll worker equipped to communicate with the particular type of disability related communication device being used by the voter.

15. A method for a disabled voter using a disability related communication device coupled to a network to register to vote from a remote location, said method comprising:

connecting to at least one voter interface unit coupled to said network, said voter interface unit being enabled to confirm identification information provided by the voter, prompt said voter to provide registration information, accept said registration information from said voter, and deliver said registration information to a registration database;

wherein the voter interface unit is operative to automatically identify the disability related communication device as being of a particular type, and to alter the manner in which it confirms identification information provided by the voter and prompts the voter to provide registration information based at least in part on the automatically identified device type; and wherein based on the identification of the type of disability related communication device, the voter interface unit is further operative to connect the voter with a live poll worker equipped to communicate with the particular type of disability related communication device being used by the voter.

16. A voter interface unit for enabling a disabled voter to vote from a location remote from a polling place using a disability related communication device coupled to a network, said voter interface unit comprising:

a memory; and a processor operatively coupled to said network and configured to confirm identification information provided by the voter, deliver ballot choices to the voter, accept a ballot choice made by the voter, and deliver the ballot choice to a tabulation system;

wherein the voter interface unit is operative to automatically identify the disability related communication device as being of a particular type, and to alter the manner in which it confirms identification information provided by the voter and delivers ballot choices to the voter based at least in part on the automatically identified device type; and wherein based on the identification of the type of disability related communication device, the voter interface unit is further operative to connect the voter with a live poll worker equipped to communicate with the particular type of disability related communication device being used by the voter.

17. The voter interface unit of claim 16 wherein said communication device communicates over a network.

18. The voter interface unit of claim 17 wherein said network comprises at least one of POTS, cable, or Internet.

19. The voter interface unit of claim 16 wherein said processor confirms identification information provided by the voter at least in part through voice recognition.

20. The voter interface unit of claim 16 wherein the processor is further enabled to provide the voter with an option to connect the voter with a live poll worker, if desired by the voter, at any time when the voter is connected to the network.

21. The voter interface unit of claim 16 wherein said voter interface unit is further enabled to prompt the voter to provide voter registration information, accept voter registration information provided by the voter, and deliver the voter registration information to a voter registration database.

22. An article of manufacture comprising a storage medium for storing one or more programs for enabling a disabled voter to vote from a location remote from a polling place using a disability related communication device coupled to a network, wherein the one or more programs when executed by a processor implement the steps of:

confirming identification information provided by the voter, delivering ballot choices to the voter, accepting a ballot choice made by the voter, and delivering the ballot choice to a tabulation system;

wherein the article of manufacture is operative to automatically identify the disability related communication device as being of a particular type, and to alter the manner in which it confirms identification information provided by the voter and delivers ballot choices to the voter based at least in part on the automatically identified device type; and wherein based on the identification of the type of disability related communication device, the article of manufacture is further operative to connect the voter with a live poll worker equipped to communicate with the particular type of disability related communication device being used by the voter.

* * * * *